(12) United States Patent
Singh et al.

(10) Patent No.: US 9,482,585 B2
(45) Date of Patent: Nov. 1, 2016

(54) METHOD AND SYSTEM FOR MULTI-FUNCTIONAL EMBEDDED SENSORS

(75) Inventors: Prabhjot Singh, Guilderland, NY (US); Guanghua Wang, Clifton Park, NY (US); Mark Allen Cheverton, Mechanicville, NY (US); Jeffrey Joseph Popielarczyk, Clifton Park, NY (US); Joseph John Shiang, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 514 days.

(21) Appl. No.: 13/467,139

(22) Filed: May 9, 2012

(65) Prior Publication Data

US 2012/0293647 A1    Nov. 22, 2012

Related U.S. Application Data

(60) Provisional application No. 61/486,761, filed on May 16, 2011.

(51) Int. Cl.

| | | |
|---|---|---|
| *G01B 11/16* | (2006.01) | |
| *G01K 11/20* | (2006.01) | |
| *F01D 17/02* | (2006.01) | |
| *G01K 13/02* | (2006.01) | |
| *G01L 23/16* | (2006.01) | |

(Continued)

(52) U.S. Cl.
CPC ............... *G01K 11/20* (2013.01); *F01D 17/02* (2013.01); *G01B 11/165* (2013.01); *G01D 5/34* (2013.01); *G01K 13/02* (2013.01); *G01L 23/16* (2013.01); *G06T 7/001* (2013.01); *F05D 2260/80* (2013.01); *G01K 2013/024* (2013.01); *G06T 2207/30164* (2013.01); *Y02T 50/671* (2013.01); *Y10T 29/49117* (2015.01); *Y10T 29/49124* (2015.01); *Y10T 29/49336* (2015.01); *Y10T 29/49769* (2015.01)

(58) Field of Classification Search
None
See application file for complete search history.

(56) References Cited

U.S. PATENT DOCUMENTS

| | | | |
|---|---|---|---|
| 4,390,565 A | * | 6/1983 | Fonda ............................. 427/504 |
| 4,708,494 A | | 11/1987 | Kleinerman |
| 5,182,449 A | | 1/1993 | Johnson et al. |

(Continued)

FOREIGN PATENT DOCUMENTS

| | | |
|---|---|---|
| CN | 101464193 A | 6/2009 |
| CN | 101858803 A | 10/2010 |

(Continued)

OTHER PUBLICATIONS

Cheng et al., "Development of Metal Embedded Microsensors by Diffusion Bonding and Testing in Milling Process", Journal of Manufacturing Science and Engineering, vol. 130, pp. 061010-1 to 061010-9, Dec. 2008.

(Continued)

*Primary Examiner* — Mikhail Itskovich
(74) *Attorney, Agent, or Firm* — Mary Louise Stanford

(57) ABSTRACT

A system and method for monitoring system including a three dimensional embedded sensor coupled to an article, wherein the three dimensional embedded sensor is a direct write embedded sensor using a high temperature light emitting material. A camera system detects illumination signals from the embedded sensors. A processing section processes the illumination signals and determines gas/surface temperatures and strain data for the article.

9 Claims, 5 Drawing Sheets

(51) Int. Cl.
*G01D 5/34* (2006.01)
*G06T 7/00* (2006.01)

(56) References Cited

U.S. PATENT DOCUMENTS

| | | | |
|---|---|---|---|
| 6,746,149 | B1 | 6/2004 | Chubb et al. |
| 6,923,048 | B2 | 8/2005 | Willsch et al. |
| 7,492,980 | B2 | 2/2009 | McCarthy et al. |
| 7,784,344 | B2 | 8/2010 | Pavelescu et al. |
| 7,912,334 | B2 | 3/2011 | Xia et al. |
| 8,135,245 | B2 | 3/2012 | Rodriguez Erdmenger et al. |
| 2004/0138850 | A1 | 7/2004 | Nakakita et al. |
| 2005/0168139 | A1 | 8/2005 | Xu et al. |
| 2006/0020415 | A1 | 1/2006 | Hardwicke et al. |
| 2006/0034559 | A1 | 2/2006 | Arias Vidal et al. |
| 2006/0082590 | A1* | 4/2006 | Stevick ............... A61B 5/0064 345/587 |
| 2008/0003353 | A1 | 1/2008 | Hardwicke et al. |
| 2009/0296776 | A1 | 12/2009 | Riza et al. |
| 2010/0217473 | A1* | 8/2010 | Andres et al. ................. 701/29 |
| 2011/0137575 | A1 | 6/2011 | Koul |
| 2012/0166102 | A1 | 6/2012 | Nieters et al. |

FOREIGN PATENT DOCUMENTS

| | | |
|---|---|---|
| EP | 0259027 A2 | 3/1988 |
| JP | 201024395 A | 2/2010 |
| JP | 2010217084 A | 9/2010 |
| WO | WO2011006260 A1 | 1/2011 |

OTHER PUBLICATIONS

Nakamura et al., "Direct-Write Sensors for Damage Assessment in Composites", Proceedings of the XIth International Congress and Exposition, 2008 Society for Experimental Mechanics Inc., 7 pages, Jun. 2-5, 2008 Orlando, Florida, USA.

Gutleber et al., "Embedded Temperature and Heat Flux Sensors for Advanced Health Monitoring of Turbine Engine Components", Aerospace Conference 2006 IEEE, 9 pages, 2006.

Turner et al., "Structural Monitoring of Wind Turbine Blades Using Fiber Optic Bragg Grating Strain Sensors", Proceedings of the SEM Annual Conference, Society for Experimental Mechanics, Inc., vol. 5, pp. 149-154, 2011.

Majewski et al., "Laser Induced Breakdown Spectroscopy for Contamination Removal on Engine-Run Thermal Barrier Coatings", Surface & Coatings Technology, vol. 205, pp. 4614-4619, 2011.

Graue et al., "Structural Condition Monitoring System for RLV Tanks", 55 International Astronautical Congress 2004, vol. 13, Vancouver, Canada, pp. 8438-8448, 2004.

Gebremichael et al., "A Field Deployable, Multiplexed Bragg Grating Sensor System Used in an Extensive Highway Bridge Monitoring Evaluation Tests", IEEE Sensors Journal, vol. 5, No. 3, pp. 510-519, Jun. 2005.

Zhang, "Novel Optical Sensors for high Temperature Measurement in Harsh Environments", 163 pages, Jul. 24, 2003.

Gentlemen et al., "Embedded Optical Sensors for Thermal Barrier Coatings", 26 pages, 2006.

McCormack, "Remote Optical Measurement of Temperature Using Luminescent Materials", Electronics Letters, vol. 17, No. 18, pp. 630-631, Sep. 3, 1981.

Pugh-Thomas et al., "CdSe(ZnS) Nanocomposite Luminescent High Temperature Sensor", Nanotechnology, vol. 22, pp. 1-7, 2011.

Clarke, "Embedded Optical Sensors for Thermal Barrier Coatings", Novel Optical Sensors for High Temperature Measurement in Harsh Environments, pp. 1-8, 2007.

Gentlemen et al., High Temperature Sensing of Thermal Barrier Materials by Luminescence, Chapter 6, 148 pages, Sep. 2006.

Gebremichael et al., "Multiplexed Fibre Bragg Grating Sensor System for Bridge Monitoring Applications", Proceedings of the 3rd International Conference on Bridge Maintenance, Safety and Management, 8 pages, 2006.

Liu et al., "Simultaneous Strain and Temperature Measurements in Composites Using Extrinsic Fabry-Perot Interferometric and Intrinsic Rare-Earth Doped Fibre Sensors", Part of the SPIE Conference on Sensory Phenomena and Measurement Instrumentation for Smart Structures and Materials, San Diego, California, SPIE vol. 3330, pp. 332-341, Mar. 1998.

Eldridge, High-Temperature Thermometer Using Cr-Doped GdAlO3 Broadband Luminescence, NASA Tech Briefs, p. 6, May 2011.

Unofficial English translation of Chinese Office Action issued in connection with corresponding CN Application No. 201280023710.5 on Aug. 1, 2014.

Li et al., "Passive Absorption/Emission Spectroscopy for Gas Temperature Measurements in Gas Turbine Engines", ASME Turbo Expo 2011, GT2011-45152, vol. No. 3, pp. 19-28, Jun. 6-10, 2011.

Unofficial English Translation of Russian Office Action issued in connection with corresponding RU Application No. 2013148906 on Mar. 18, 2016.

\* cited by examiner

METHOD AND SYSTEM FOR MULTI-FUNCTIONAL EMBEDDED SENSORS

CROSS REFERENCE TO RELATED APPLICATIONS

This application is a non-provisional of and claims priority from U.S. provisional patent application, Ser. No. 61/486,761, filed on May 16, 2011, the entire contents of which is incorporated herein by reference.

BACKGROUND

Monitoring, particularly in harsh environments, is a challenge in many industry applications. The ability to provide reliable data in real-time in such harsh environments has applicability in jet engines, power generation gas turbines, industry finances, and manufacturing processes and the like.

For illustrative purposes, electric power generation is described herein. By its very nature, large scale electric power generation using fossil fuels involves processes that occur at extremes of both temperature and pressure conditions. Monitoring these processes, and the condition of the equipment in which they occur, is of paramount importance for reliable, cost-effective, efficient power generation. Monitoring of turbine machinery used in power generation would be particularly useful. Modern gas turbine achieve higher efficiency and reduced fuel consumptions by using higher combustion temperatures, hotter coolant temperatures from higher pressure ratios, and reduced cooling flow rates. In addition, higher combustion temperatures adversely affect the availability, reliability, and safety of gas turbines, particularly the life of high cost, critical hot gas path (HGP) components. The life of power system components working under harsh environments depends strongly on temperature and strain. Improved temperature measurement accuracy would directly translate into an improved turbine operating efficiency due to the ability to safely operate the machine close to its operating limits. High fidelity inputs for physics based lifing models would enable order-of-magnitude improvements in lifing prediction accuracy. In most advanced gas turbines, combustion temperatures exceed the melting point of the HGP components, and these components must be actively cooled. Large design safety margins are generally incorporated for these critical components. High fidelity real-time data would improve confidence in design safety margins and potentially shorten the turbine design cycle. Multi-property online measurements during the power system tuning phase would enable designers to better assess critical component lifing and potential compensating design modifications. The accurate, real-time, simultaneous measurement of strain and temperature in the monitoring of power systems/component may improve prediction accuracy of physics based lifing models. This improved accuracy may translate into improved turbine operating efficiency due to the ability to safely operate the machine closer to its operating limits. In one example, calculations show a 10% reduction in cooling flow can lead to up to $9 million of savings during the 20-year operating life of one combined cycle gas turbine.

Despite the need to obtain accurate online temperature and strain data from within an operating turbine machine, achieving this goal has remained quite elusive. Within the past decade, development of rare-earth based light emitting materials that are suitable as optical (luminescence-based) thermometers has enabled some progress to be made; however, issues of relatively high cost and poor sensitivity at very high-temperatures remain. In addition, the online optical detection of strain has not yet been adequately addressed. There is a continued desire to address this monitoring need by developing a low cost, non-intrusive, multi-functional embedded sensor system for online assessment of power systems.

BRIEF DESCRIPTION

In one embodiment, the present invention relates to monitoring system including a light emitting sensor in direct contact with an article, a high-speed image acquisition system for detecting an optical image of the light emitting sensor, and a high-speed data processing system for analyzing the image to determine temperature of the article, strain of the article, or a combination thereof.

In another aspect, the present invention relates to an optical method for on-line monitoring of an article in a harsh environment. The method includes exposing the article to the harsh environment, acquiring an image of a light emitting sensor in direct contact with the article using a high-speed image acquisition system, and analyzing the image using a high-speed data processing system to determine temperature or strain of the article, or a combination thereof. In some embodiments, the light emitting sensor is formed on the article by a direct-write process.

In yet another aspect, the present invention relates to a method for manufacturing an article for use in a harsh environment. The method includes forming a light emitting sensor on a surface of the article by a direct write process, screen printing, thermal spray, aerosol spray, or other printing process, interfacing the article with a high-speed image acquisition system and high-speed data processing system, and configuring the high-speed image acquisition system and high-speed data processing system to acquire an image of the light emitting sensor in the harsh environment and determine temperature of the article, strain of the article, or a combination thereof.

Advantages of the described system include real-time online monitoring and diagnostics of components and systems, particularly those in harsh environments, with the potential for achieving improved reliability for equipment such as power generating equipment using physics based lifing. The system also provides for condition-based maintenance and prognostics while reducing the carbon footprint as compared to other sensing systems.

BRIEF DESCRIPTION OF THE DRAWINGS

The presently disclosed subject matter will be better understood from reading the following description of non-limiting embodiments, with reference to the attached drawings, wherein below.

DETAILED DESCRIPTION

Figure 1:
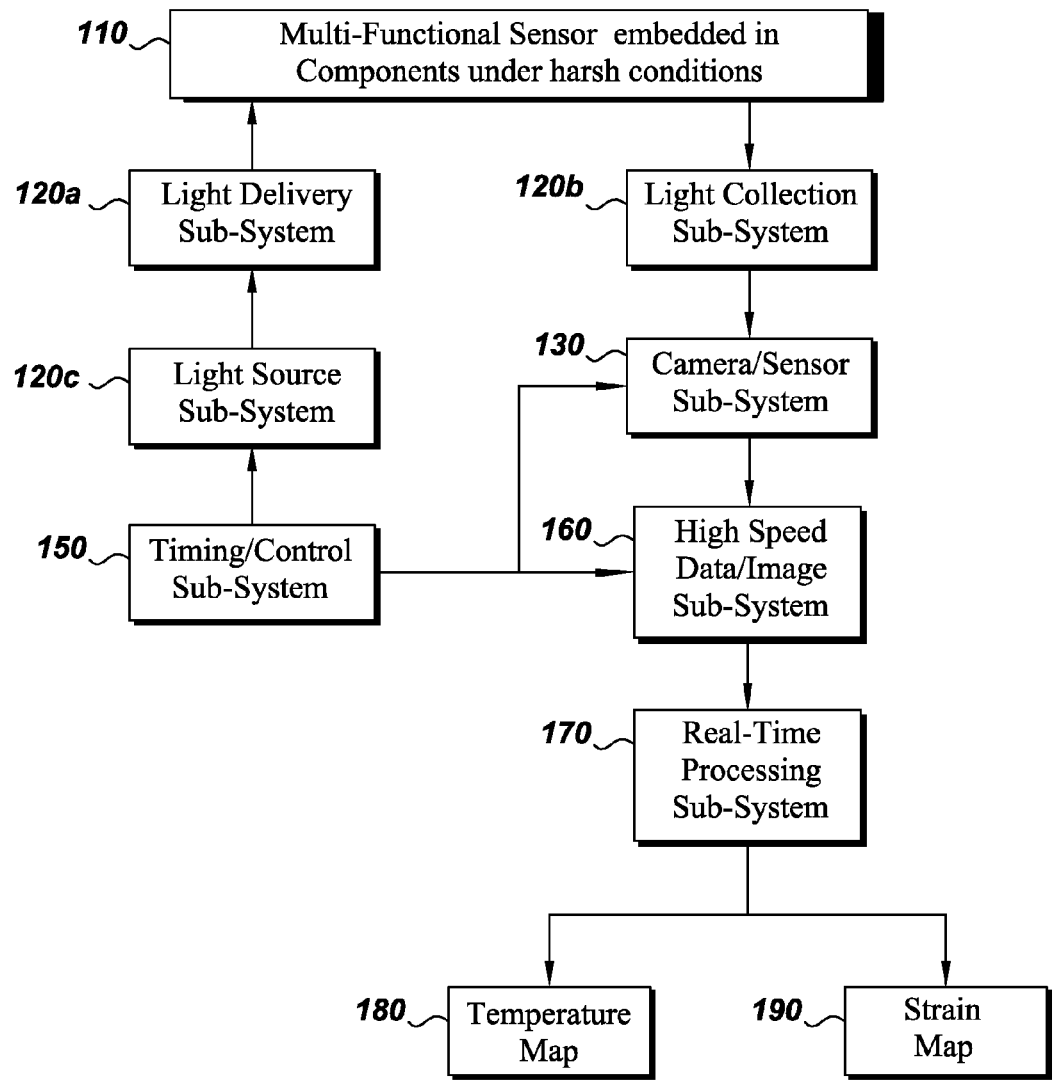
FIG. 1 is a simplified system diagram for multi-functional embedded sensors for real-time online monitoring in accordance with various embodiments.

The foregoing summary, as well as the following detailed description of certain embodiments, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers, circuits or memories) may be implemented in a single piece of hardware or multiple pieces of hardware. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The measurement system is capable of measuring gas/surface temperatures with uncertainties of ±5° C. in the range of 20-1700° C., and strains with an accuracy of ±0.0002 under the harsh environmental conditions, such as associated with power turbine operation, including steam turbines, generators, Heat-Recovery Steam Generator (HRSG), and coal fired boilers. Other examples of articles for the embedded sensors include vanes, rotors, stators, combustion liners, nozzles, casings, disks, furnaces, equipment for use in high temperature manufacturing processes, such as metal processing, and casting processes, downhole drilling applications, such as geothermal and oil and gas operations.

FIG. 1 is a simplified schematic diagram illustrating system 100 using direct-written light emitting sensors to measure strain and gas/surface temperature, wherein the sensor produces an optical signal and the signal is acquired using a visible of uv light camera with fast computing hardware used to measure strain in real-time configuration in accordance with various embodiments. The system includes article 110 having a direct write light emitting embedded sensor composed of a high temperature light emitting material, a light collection system 120a, light delivering system 120b, (such as fiber scope or borescope), and optional light source system 120c, camera system 130, a supporting timing/control system 150, data/image acquisition system 160, and high-speed data processing algorithms and hardware 170. In some embodiments, the optical detection system has the capability of imaging at multiple wavelengths. Images from the camera are processed to provide real-time online gas/surface temperature map 180 and/or strain map 190.

Figure 2A:
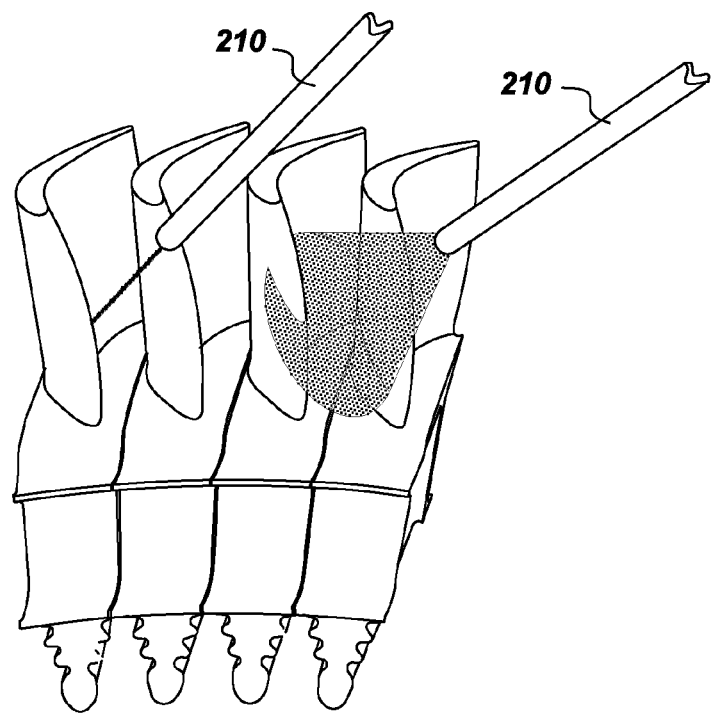
FIG. 2A shows a line of sight (LOS) and imaging Radiation Thermometry (RT) system for online monitoring of first stage blade surface temperature.
Figure 2B:
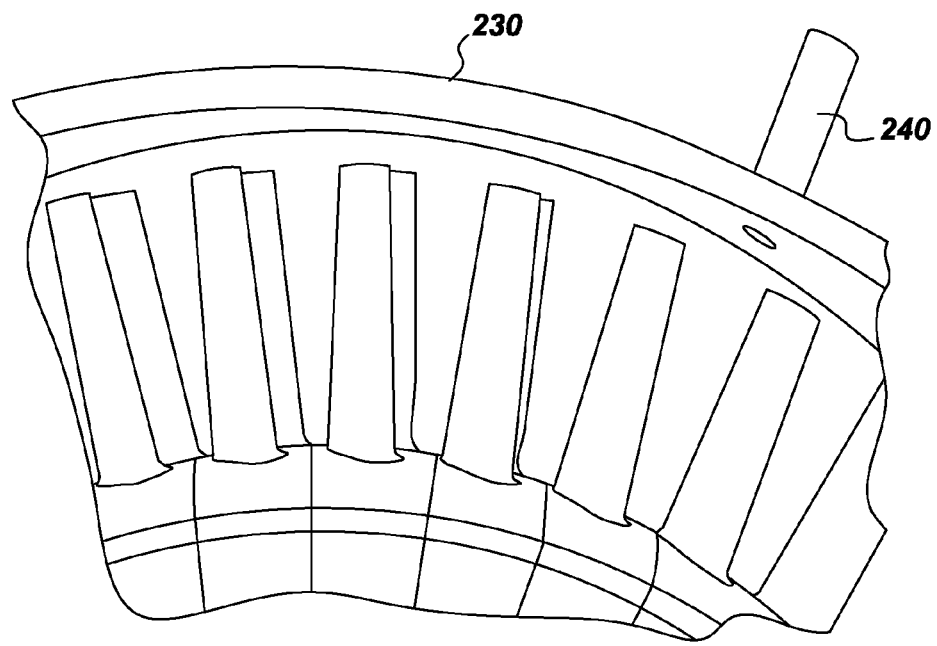
FIG. 2B illustrates the optical probe outside of the hot gas path flow.

In one embodiment, light collection system 120a and light delivering system 120b are harsh-environment imaging system that is capable of temperature measurements have the resolution required to make strain measurements with the required sensitivity. These include, for example, online line-of-sight (LOS) and imaging radiation thermometry (pyrometry) systems for real-time measurement of surface temperature of components in gas turbines, e.g. first-stage blade. Optical access ports for harsh environment applications that allow remote interrogation of emission or photoluminescence under harsh environments; examples are shown in FIGS. 2A and 2B. The LOS system in FIG. 2A is a monitoring accessory for heavy duty gas turbines and aviation jet engines. FIG. 2B shows probes 210 disposed in optical access ports 220 on the gas turbine casing 230 (not shown in FIG. 2A), which are outside of the hot gas path flow.

Advanced imaging systems, such as high-speed CMOS video and ICCD cameras, may be used to obtain images. In general, high resolution visible cameras operating in the visible or uv wavelength bands and having the imaging capability for the spatial resolution required for strain measurement. e.g. 0.1 mm/pixel may be used. An ICCD camera may be phase-locked to the oscillations to provides phase-averaged images during a single pressure oscillation cycle. A detection system based on multi-wavelength thermometry for gas/surface temperature measurements based on passive absorption/emission spectroscopy may be used at high pressures (>15 atm) and temperatures (up to 1700° C.), as described by H. Li, G.-H. Wang, N. Nirmalan, S. Dasgupta and E. R. Furlong, Passive Absorption/Emission Spectroscopy for Gas Temperature Measurements in Gas Turbine Engines, ASME Turbo Expo 2011, GT2011-45152, the entire contents of which is incorporated by reference. In this method, incoming light is separated into several beams and then detected by individual detectors with narrow band-pass filters. Temperature may be measured with fast time response, i.e. 10 kHz or higher.

Figure 3:
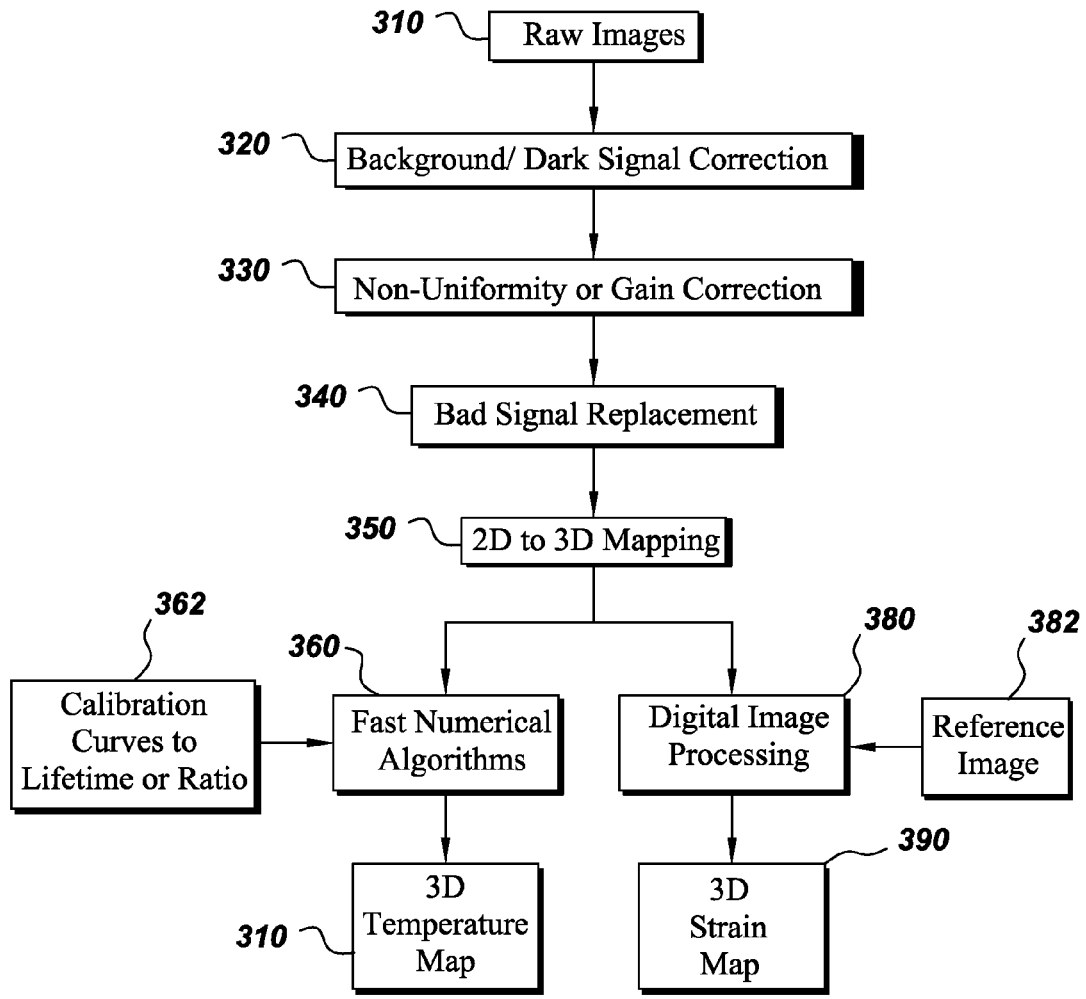
FIG. 3 is a block diagram of processing for data and images to yield temperature and strain maps.

FIG. 3 is a schematic diagram of system software for image and data processing to determine temperature and strain. Raw images are input in 310, background/dark signal is corrected in 320 and non-uniformity or gain is corrected in 330. Bad signal replacement is performed in 340 and then 2D to 3D mapping in 350, where the measured 2D raw image is projected to a 3D design CAD model. The resulting data is input to fast numerical algorithms module 360, which uses lifetime or ratio calibration curves 362 if necessary to determine 3D temperature map 370. The digital image may be processed in 380 in combination with reference image 382 to yield 3D strain map 390.

A temperature map may be inferred from optical signals of the embedded sensor. A strain map may be simultaneously inferred by correlating the fine pattern with a reference pattern. Luminescence thermometry uses the temperature and wavelength dependent emission characteristics of light emitting materials—i.e. following excitation by light or heat, light emitting materials emit photons at a temperature-dependent rate and intensity. Use of wavelength dependent detection allows for increased accuracy of the temperature determination and increased contrast of the strain information. There are generally two approaches to measure temperature from the optical signal, i.e. the lifetime and ratio techniques. The ratio technique utilizes characteristics of the emission spectra of light emitting materials, i.e. some emission lines are almost independent of temperature, whereas others vary with temperature. Therefore, a calibration using the ratio of emission lines can be used to infer temperature. The lifetime technique utilizes the decay mechanism of light emitting emission, which is independent of illumination energy, target motion, non-uniform excitation light distribution, and surface deformation. To obtain a temperature map from the embedded sensor system, both lifetime imaging and ratio imaging techniques using known detection protocols may be employed, including multi-color imaging radiation thermometry, ratio pyrometry, and high-speed imaging.

Using a combination of luminescent and high emissivity material to manufacture the light emitting sensor is possible and has the advantage in some embodiments of an increased operating temperature dynamic range. For example, for many materials, optically stimulated luminescence has good temperature accuracy at temperatures of less than about 1000° C., while thermal emissivity (pyrometry) methods for temperature measurement are most effective at temperatures over about 1000° C.

Optical techniques used to detect displacement and measure strain include Moiré techniques and speckle interferometry for high resolution measurement of local strain. Strain is determined by using digital imaging to correlate distortion in the pattern (e.g. grids, array of marks, and Moiré etc.) to a reference image. For large deformation strain measurements, grids and array of dots are sometimes used. In some embodiments, optical methods to measure small deformations and strains with an uncertainty of ±0.0002 may require feature geometries are about 2×2 mm2 with a pattern (dot) size of 400 microns, and the required imaging system resolution is about 0.1 mm/pixel. Pattern shapes (Moiré, grid, dots) and required length scales may be disposed by the article by DW manufacturing methods. Fast image correlation/registration algorithms may be used to determine displacement and strains. These methods typically overlay the real-time image of patterns onto a reference pattern, thereby determining the extent of local deformation. Grids or arrays of dots improve strain measurement accuracy by enhancing contrast from the optical signal, especially in enclosed dark harsh environments.

Figure 4:
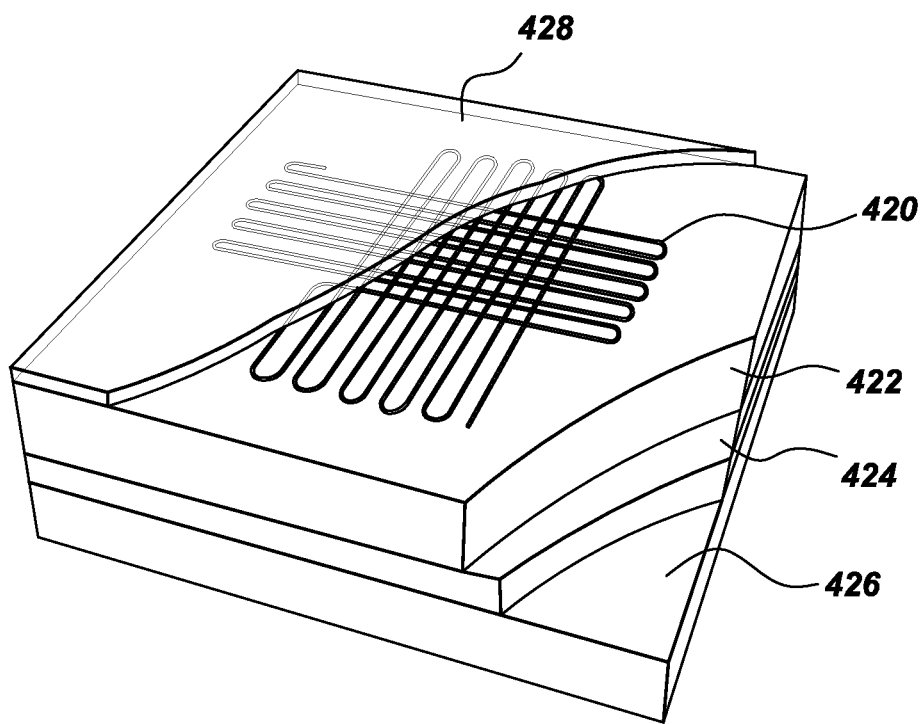
FIG. 4 shows one embedded sensor architecture wherein fine patterns of high-temperature light emitting materials are direct written and then covered with a protective top coat.

FIG. 4 illustrates an embedded sensor architecture 400 wherein fine grid patterns 420 of a high-temperature light emitting material are direct written on thermal barrier coating (TBC) 422, which is adhered to bond coat 424 disposed on the article surface 426. In the illustrated example, a protective layer 428 covers the sensor to extend service lifing, although the protective coating is not necessary in many embodiments. In some embodiments, the protective layer may be an additional TBC layer.

Figure 5:
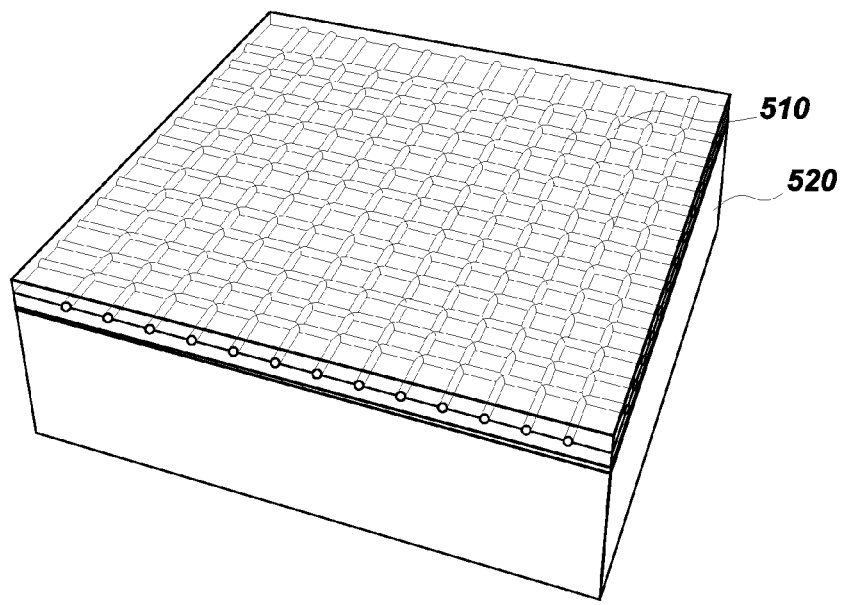
FIG. 5 illustrates the multi-function embedded sensor system for simultaneous gas/surface temperature and strain measurements under harsh environments.

Referring to FIG. 5, an embedded sensor in the form of a geometric pattern 510 is printed on the surface 520 of hot gas path components via ink-based direct-write methods. These patterns are sintered to high densities by local heating. If the sensor is composed of a luminescent material, an optical signal may be generated by exciting the pattern with a pulsed light source; for emissive materials, the signal may be produced without excitation by external light. The signal is acquired with a high-speed camera capable of imaging an in-service component. Temperature is measured using well established (lifetime and/or ratio) luminescence thermography techniques. Strain is derived by correlating the deformed geometric pattern to a reference image. The real-time measurement of strain is enabled by recent advances in image processing algorithms and high-speed image acquisition. Real-time online monitoring and diagnostic systems, wherein turbine blade temperature and strain datasets are fed to control systems and physics-based lifing models may enable online prognosis and lifing predictions of critical components.

Figure 6:
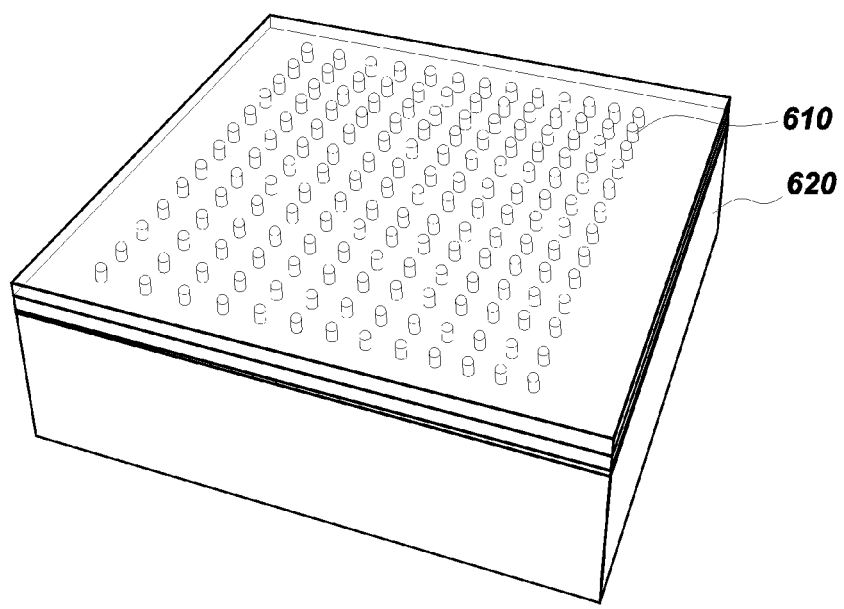
FIG. 6 illustrates another embodiment of the embedded sensor architecture, wherein the top and bottom of the 3D fine structures are direct written with high-temperature light emitting materials.

FIG. 6 shows another embodiment of the embedded sensor architecture, which is a 3D architecture for determining gas and surface temperatures. In this architecture, each dot 610 disposed on surface 620 of the component may be effectively an independent sensor. The top and bottom of the 3D fine structures may be fabricated from different high-temperature light emitting materials by an additive direct write process. A surface temperature map may be determined from the optical signals emitted at the bottom of the 3D structures. Simultaneously, a surface temperature at the top of the 3D structure can be determined from the emitted signals. The heat transfer rate across the 3D structures can be calculated based on the two temperature measured, which can be used to infer the free stream gas temperature. This can be extended to measure a strain map at the same time. In one example, a structure that is capable of determining strain has a feature size of ~70 micron in diameter and 40 micron high. The spacing between fine structures is ~70 micron.

Gas temperature map may be calculated using data obtained from the 3D embedded sensor. For example, the temperature difference between the free stream gas/fluid and the surface develops the thermal boundary layer. This temperature difference leads to the energy exchange between the free stream and the surface. The heat transfer rate per unit area between the free stream gas/fluid and the surface can be expressed as in equation 1. At the surface, the heat transfer rate per unit area due to conduction can be written as in equation 2. The heat transfer rates of convection and conduction are the same at the surface, which can be used to infer the free stream fluid temperature as in equation 3. Using non-dimensional parameter, Nusselt number, the free stream gas temperature can also be expressed as in equation 4. Thermal conductivity, heat transfer coefficient, and Nusselt number can be measured from calibration test, numerical simulations, and experimental data bases.

$$q = h(T_\infty - T_1) \qquad 1$$

$$q = \frac{k}{L}(T_1 - T_w) \qquad 2$$

$$T_\infty = T_1 + \frac{k}{hL}(T_1 - T_w) \qquad 3$$

$$T_\infty = T_1 + \frac{1}{Nu}(T_1 - T_w) \qquad 4$$

where $T_\infty$ is the temperature of the free stream gas/fluid $T_1$ is the surface temperature of the top of the 3D structure $T_w$ is the surface temperature of the bottom of the 3D structure, which is the same as the surface temperature h is the heat transfer coefficient k is the thermal conductivity of the 3D structure material L is the thickness of the 3D structure Nu=hL/k is the Nusselt number Materials for use in the embedded sensors emit light in the IR, visible, or UV range at use temperatures in the range of 20-1700° C. In the context of the present invention, the term 'light emitting" means luminescent, including fluorescent and phosphorescent, or thermally emissive. Luminescent materials emit light upon excitation by light of a different wavelength. Thermally emissive materials emit light at a temperature that is characteristic for the material, and high emissivity material radiate light at elevated temperature over a broad wavelength range from visible to infrared. In some embodiments, the ratio of temperature dependent to temperature independent emission can be used to infer temperature. In other embodiments, decay of the emission can be used to determine temperature.

Materials that are suitable for use in the embedded sensors include, but are not limited to, emissive transition metal ceramic oxides, such as chromium ($Cr_2O_3$), and luminescent materials, such as rare earth oxides, particularly europium oxides. These materials may be used either as neat oxide materials or may doped into a matrix material that is stable under harsh environmental conditions, for example, zirconia or alumina. The amount of light emitting material present as a dopant may range from about 0.1% to about 30%, particularly from about 0.1% to about 10%.

In one example, alumina is doped with chromium oxide. Chromium oxide, when sintered with alumina, changes from a green color to a pink color. The chromium oxide becomes incorporated into the alumina matrix and becomes a color center, shifting the absorption spectrum of the chromium oxide and causing the color shift. The material has a very high emissivity in the visible spectrum. In another example, rare earth oxides (REOs) of Eu, Sm and Tb doped in a yttria-stabilized-zirconia (YSZ) matrix, particularly YSZ doped with $Eu_2O_3$, may be used. Dopant levels are typically specific to the materials, and generally range from about 0.1% to about 30% by weight. For chromia-doped alumina, the amount of chromia may range from about 1% to about 25% by weight. For YSZ doped with $Eu_2O_3$, in one embodiment, the dopant is present at 8% by weight. Peel tests done on the deposited patterns revealed good adhesion with the base surface. Erosion and lifing tests, on power system components operating in relevant environments, predict long service lifing of the embedded sensor. With the excitation at 254 nm, the embedded sensor generates optical signals near 590 nm. Other REO material that provide high-sensitivity temperature measurements without compromising the thermal and mechanical properties of the base material (thermal barrier coating, environmental barrier coating, or uncoated metals) are also within the scope of the system and techniques.

The embedded sensors may be fabricated by a direct write process. Direct writing refers to a set of techniques wherein an ink composed of a functional material (metal or ceramic) suspended in a fugitive binder is directly deposited on a base substrate and then sintered to high density. Various ink and thermal spray based direct-write (DW) processes are commercially available. In addition, ink formulations for ceramic and metal deposition are well understood. Specially formulated inks composed of a fugitive binder (or carrier material) and a ceramic or metal additive are used to selectively deposit traces of materials on 3D surfaces. These systems are capable of depositing inks of 10-10000 cps viscosity permitting a heavy particle loading that leads to good sintering. Material traces as thin as 10 microns can be directly written on non-planar surfaces. Good feature fidelity and light emission under illumination by UV or visible light. Multi-layer deposition requires the selection of compatible materials and development of co-sintering strategies to obtain high density and good bonding with the base material.

The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as an optical disk drive, solid state disk drive (e.g., flash RAM), and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), application specific integrated circuits (ASICs), field-programmable gate arrays (FPGAs), graphical processing units (GPUs), logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program, which may form part of a tangible non-transitory computer readable medium or media. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

EXAMPLES

Direct Write Process Using Emissive Chromia Ink
General Procedure

Formulations that were tested consisted of aluminum oxide (CR6 from Baikowski), chromium oxide, a thermally curing polymer (trade name V006, from Heraeus), and a solvent to modify the viscosity so that the material can be dispensed at 60% volume fraction aluminum oxide, using 3%, 6%, and 9% chromium concentration by weight. The alumina and chromia powders were mixed and then combined with the polymer. Terpineol solvent was then added to the mixture and mixed in a Thinky planetary mixer with zirconia media balls added to facilitate mixing and grinding to smaller particles for 30 minutes at 1000 RPM without vacuum. The viscosity was then evaluated, and more Terpineol added to further reduce the viscosity and mixed for additional time in the Thinky. The materials were then coated onto alumina substrates, and put into a furnace, and imaged using a Canon Eos 3Ti SLR camera. The samples were heated to 1200° C., and then the furnace door was opened, and pictures were taken. The furnace door was closed and the process repeated as the parts cooled while recording the temperature of the furnace.

Once the images were acquired from the furnace, images were processed, to measure brightness of the pixels in the image, in each color plane, Red, Green, and Blue. The red plane was extracted from the color image acquired from the Canon camera, and the average pixel intensity of the chromium lines were measured, and plotted vs. temperature of the display.

It was determined that when the viscosity of the material was too low, the material would spread after being deposition, generating wide lines that were not very thick. If the viscosity was too high, then wide syringe needles would be needed because of difficulties to get the material to flow. Wide needles also mean wide lines, but with sufficient air pressure pushing the material out of the needle and with sufficient deposition speeds, it was possible to get thinner lines to be deposited. The process of using direct write deposition techniques requires one to balance the viscosity, syringe needle diameter, feed rate (deposition speed), and air pressure to the dispenser to optimize the features being written. It was found that when the lines written on the alumina substrate were too thin, that is, too shallow, then the chromium lines did not glow very bright in the furnace when heated to over 1000° C.

Example 1

Inks containing chromia at four different concentrations, 3%, 6%, 9%, and 25% were coated on alumina substrates of varying thickness ranging from 50 um to 300 um. These samples were then sent to Surface Optics, San Diego, Calif., for emissivity measurements. The data confirmed that the thicker the material, the higher the emissivity. In addition, it also showed that the higher the chromium concentration, the higher the emissivity.

Example 2

Based on the earlier results, additional chromium lines were written, using direct write technology, in order to make thinner and closer spaced lines. Viscosity of the chromium material was reduced by adding terpineol, and the pressure at which the material is pushed through the dispenser and the speed at which the dispenser moves across the substrate were modified. The pressure ranged from 40 psi to 60 psi. Dispense speeds ranged from 300 for thick lines ranging from 1.5 mm-1 mm, to 1000 for lines ranging from 100 um to 200 um. These chromium written samples were also put in a furnace and heated from 800 C. to 1200 C., and the intensity of the chromium lines were found to change with temperature.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

The invention claimed is:

1. A monitoring system comprising:
   a light emitting sensor in direct contact with an article;
   a high-speed image acquisition system for detecting an optical image of the light emitting sensor; and
   a high-speed data processing system for analyzing the image to determine strain of the article,
   wherein the light emitting sensor is disposed on a surface of the article in the form of a geometric pattern, wherein the geometric pattern is in the form of a grid, an array of marks, a Moiré pattern, or combinations thereof, and wherein the light emitting sensor comprises features of about 70 microns in diameter and 40 microns in height, and spacing between the features is about 70 microns.

2. A monitoring system according to claim 1, additionally comprising a pulsed light source for exciting the light emitting sensor.

3. A monitoring system according to claim 2, wherein the pulsed light source comprises a light emitting diode (LED) array or a laser.

4. A monitoring system according to claim 1, wherein the light emitting sensor is formed on the article by a direct-write process.

5. A monitoring system according to claim 1, wherein the light emitting sensor comprises a temperature sensitive light emitting ceramic material.

6. A monitoring system according to claim 5, wherein the temperature sensitive light emitting ceramic material comprises a rare earth oxide or chromium oxide.

7. A monitoring system according to claim 1, wherein the light emitting sensor comprises chromium oxide.

8. A monitoring system according to claim 1, wherein the light emitting sensor comprises alumina doped with chromium.

9. A monitoring system according to claim 1, wherein the light emitting sensor comprises a rare earth oxide.

* * * * *